Feb. 15, 1972     C. B. DAVIS     3,642,928
CATALYZED ISOMERIZATION OF α-PINENE
Filed July 28, 1969
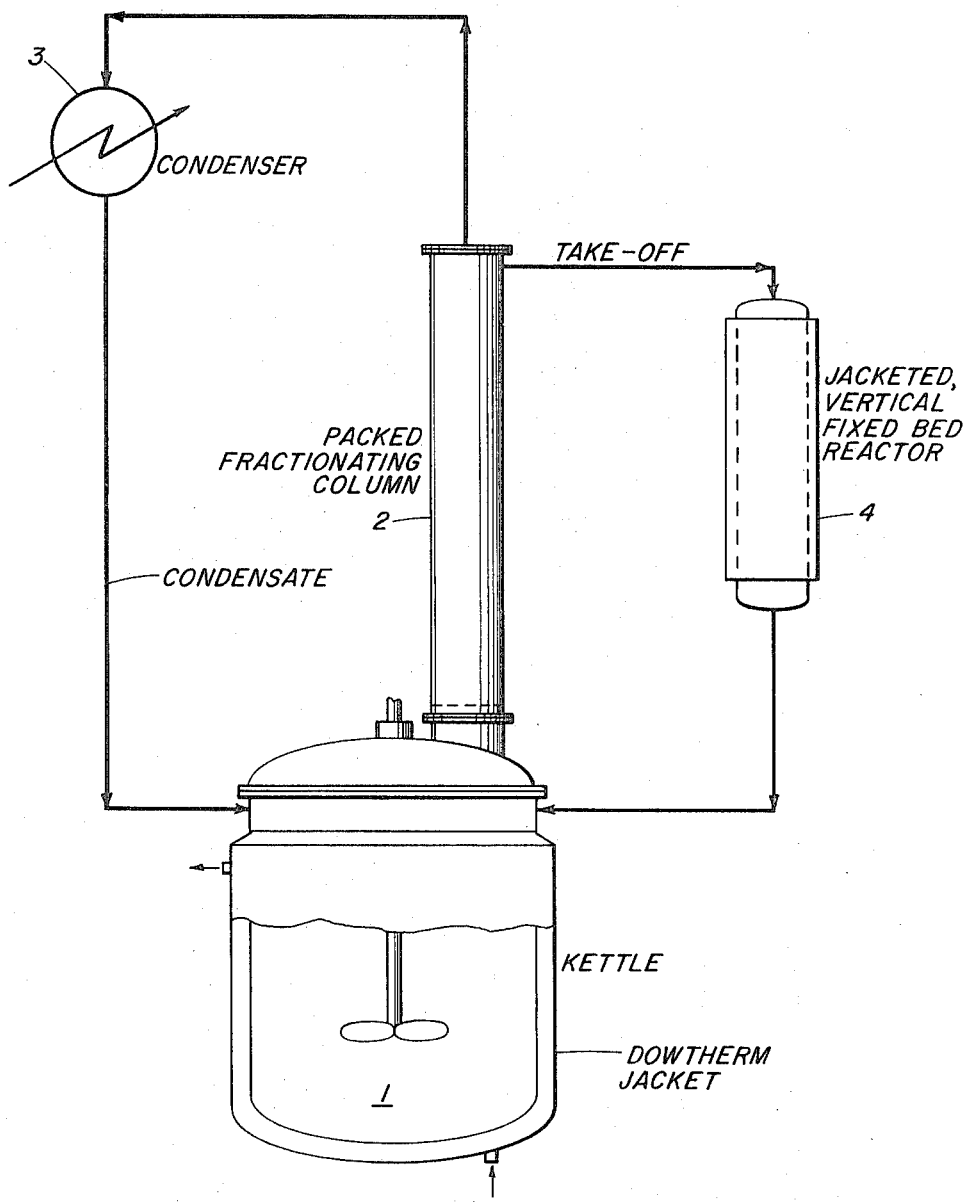
INVENTOR.
CURRY BEACH DAVIS
BY
*Charles J. Hickey*
ATTORNEY

United States Patent Office 3,642,928
Patented Feb. 15, 1972

3,642,928
CATALYZED ISOMERIZATION OF α-PINENE
Curry Beach Davis, Panama City, Fla., assignor to
Arizona Chemical Company, New York, N.Y.
Filed July 28, 1969, Ser. No. 845,430
Int. Cl. C07c *5/30, 13/00;* C09f *3/02*
U.S. Cl. 260—675.5                          7 Claims

ABSTRACT OF THE DISCLOSURE

A continuous process is described for the isomerization of α-pinene, β-pinene, or turpentine, by means of 13X zeolite catalyst, to give an isomerizate containing predominantly dipentene and minor amounts of terpinolene and camphene.

---

This invention relates to an improved process for the isomerization of terpenes, in particular turpentine and α-pinene. More particularly, it relates to the production of depentene by isomerization of turpentine or α-pinene by means of heating in the presence of a selective catalyst.

Dipentene is an important article of commerce and is in great demand for the production of terpene resins used in hot-melt coatings, adhesives, and the like. The prior art shows many examples of isomerizing α-pinene. Thus, Kharasch and Reynold U.S. Pat. 2,382,641 teaches the conversion of optically active α-pinene to limonene (the optically active form of dipentene) by heating with organic acids, such as benzoylbenzoic or salicylic acids, in the presence of organic acid amides, such as formamide or acetamide, at 140–200° C. for 15–50 hours. The process of the present invention is advantageous in that employment of substantial quantities of expensive organic acids and amides is avoided and in that the isomerization is effected in about 1–16 hours and in excellent yields.

Frilette and Weisz, in U.S. Patent 3,140,322, teach the use of 10X zeolite to reduce polymer formation in the isomerization of α-pinene to yield camphene as the main product.

In discussing the activity of 13X molecular sieves in the Journal of Physical Chemistry, vol. 64, p. 382, Weisz and Frilette state that "α-pinene undergoes no reaction when refluxed with the Na+ form (the 13X form), but is converted extensively to camphene by the Ca++ salt."

Derfer and Bordenca, in U.S. Patent 3,270,075, teach the isomerization of α-pinene to a dipentene-rich isomerizate with a 10X or 13X zeolite at a temperature in the range of about 65° C. to about 110° C. They specifically warn against using higher temperatures. For example, at column 8, line 24 ff., it is stated that when temperatures of about 135° C. to 154° C. are employed, considerably more camphene is produced and in most instances camphene becomes the predominant product.

Furthermore, in Example 1, at column 6, line 20 ff., it is stated that when α-pinene is treated at 150° C. with a 13X molecular sieve catalyst, the isomerizate obtained is found to contain only 10% of the desired product.

It is an object of this invention to provide a continuous process for producing dipentene from α-pinene or turpentine in high yield and a short period of time. A further object is to provide a process wherein the amount of undesirable products is minimized. Another object is to prevent catalyst poisoning by oxygenated terpenes and trace poisonous compounds in the pinene feed.

These and other objects of the present invention will become apparent as the description thereof proceeds.

It has now been unexpectedly found in accordance with the present invention that high yields of dipentene can be obtained by isomerizing pinene or turpentine at temperatures of about 140° C. to about 200° C., using a 13X zeolite catalyst and including a distillation of the pinene prior to contact with the catalyst.

Furthermore, only minor amounts of terpinolene and camphene are formed as by-products. The process is carried out continuously, and the catalyst is protected from oxygenated terpenes and other poisons and is readily regenerated for further use.

Zeolites generally are alkali metal or alkaline earth metal aluminosilicates. Their crystal structures are such that they have a large number of pores characterized by exceptionally uniform size. Typically, the synthetic zeolite marketed as "Molecular Sieve 13X" by Linde Division of Union Carbide Corporation has the composition

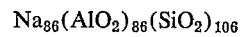

$$Na_{86}(AlO_2)_{86}(SiO_2)_{106}$$

and an effective pore diameter of about 10 angstroms. As sold commercially, these catalysts are substantially anhydrous, normally having a water content of about one percent. Although the catalyst is operative over a wide range of water content, as well as in anhydrous form, the reaction proceeds at the fastest rate when the 13X molecular sieve is slurried with water and subsequently dried at a temperature of about 100° C. to about 450° C., and preferably at 300° C., so as to obtain a catalyst having a water content of about two to about six percent and preferably four percent.

The terpenes which may be used in the practice of the instant invention include α-pinene and β-pinene, as well as turpentine.

In a preferred embodiment of this invention, α-pinene is heated at reflux and passed through a distillation column to the top of a reactor with about 0.25–2% 13X molecular sieve catalyst. The resulting isomerizate is then recycled to the original heating vessel and remains due to its higher boiling point.

The isomerization process of the present invention is generally carried out at temperatures of 140–200° C. Preferred reaction temperatures are in the range of 150° C. to 175° C. In general, the exposure of the catalyst to the feed will be short due to the high space velocity.

Since the catalyst is not subjected to contact with injurious compounds, it may be reused many times, so that the catalyst volume may be substantially reduced below the amount generally required in a reactor and the α-pinene feed is continuously recycled through the catalyst bed.

The invention may be better understood by reference to the figure which is a flow diagram of the process of the present invention.

In the figure, an α-pinene containing feed is charged to a heating kettle 1. The α-pinene feed, as is well known in the art, contains a small oxygenated terpene and trace amounts of unknown compounds. These oxygenated terpenes and unknown compounds have been found to be poisonous to the 13X zeolite catalyst.

The α-pinene feed is heated until the α-pinene distills and passes up packed fractionating column 2. The poisonous compounds which are higher boiling than α-pinene remain behind in kettle 1.

The α-pinene distillate is split, with a portion being taken off from column 2 and cycled to the top of a fixed bed catalyst reactor 4, and the remainder going to a condenser 3 and returning as condensate to kettle 1.

Reactor 4 is relatively small in volume in comparison to the amount of catalyst required to complete the reaction in the batch process. The amount of catalyst may be as little as about one-tenth the required volume.

The α-pinene distillate is cycled through catalyst reactor 4 at a relatively high space velocity so that the entire amount will not be completely converted to the dipentene and other products. The mixture from reactor 4 is cycled from the bottom of the reactor and returned to kettle 1. The reacted mixture containing converted products and unreacted α-pinene becomes admixed with the recycled α- pinene condensate, α-pinene as yet undistilled, and the poisonous compounds.

Since the converted products are higher boiling than α-pinene, they will remain in kettle 1 with poisonous compounds while the α-pinene is continuously distilled and cycled through condenser 3 and reactor 4. When all the α-pinene has been converted, kettle 1 will contain the desired converted product. The amount of compounds poisonous to the catalyst is not sufficient to be deleterious to the product. Thus, the final product is obtained by simply withdrawing mixtures from the kettle. It may be desirable to separate the various products such as dipentene, camphene and terpinolene for further use.

The process is thus continuous, requires a small volume of catalyst and provides protection against detactivation of the catalyst. The process is carried out continuously, and under autogenous elevated, or reduced pressure.

The following example further illustrates the invention and is not intended to limit the scope thereof in any manner.

EXAMPLE I

The process of this example is illustrated by the flow diagram of the figure.

3,200 lbs. α-pinene was charged to kettle 1 which was heated to 160° C. to cause the α-pinene to distill through packed fractionating column 2, said column being operated at a 1:1 reflux ratio and the distillate being fed directly to the top of jacketed vertical fixed bed reactor 4 containing 20 pounds of 13X molecular sieves supported on fiber glass, said reactor being kept at a temperature of 155° C., with the isomerizate and unreacted α-pinene flowing back into kettle 1. The entire process was carried out under an inert atmosphere, preferably nitrogen.

I claim:

1. A method of producing a product containing predominately dipentene from a pinene containing feed, said feed also containing oxygenated terpenes and other materials poisonous to the catalyst used, which comprises distilling said pinene containing feed, whereby the poisons are left behind, and a distillate is obtained, and isomerizing said distillate free of said poisons in the presence of a sodium containing aluminosilicate zeolite of the 13X-type having the composition $Na_{86}(AlO_2)_{86}(SiO_2)_{106}$ and an effective pore diameter of about 13 angstroms, at a temperature of from about 140° C. to about 200° C.

2. The method of claim 1 wherein said feed is predominantly α-pinene.

3. The method of claim 2 wherein said feed is predominantly β-pinene.

4. The method of claim 1 wherein said feed is turpentine.

5. The method of claim 1 wherein said distillation temperature is from about 150° C. to 175° C.

6. The method of claim 1 wherein said distillate is passed through said catalyst and recycled to said feed.

7. The method of claim 6 wherein said catalyst volume is less than the amount required to convert all of said feed, and unconverted feed is recombined with starting feed and recycled through said catalyst.

References Cited

UNITED STATES PATENTS

| 2,382,641 | 8/1945 | Kharasch et al. | 260—675.5 |
| 2,882,244 | 4/1959 | Milton | 252—455 |
| 3,270,075 | 8/1966 | Derfer et al. | 260—675.5 |
| 3,278,623 | 10/1966 | Derfer | 260—675.5 |
| 3,377,400 | 4/1968 | Wise | 260—668 |

OTHER REFERENCES

Weisz and Frilette, "Catalysis by Zeolite Salts," J. Phys. Chem. 64, 382 (1960).

DELBERT E. GANTZ, Primary Examiner

G. E. SCHMITKONS, Assistant Examiner

U.S. Cl. X.R.

252—455 Z; 260—666 A